United States Patent
Miller

[11] 3,802,597
[45] Apr. 9, 1974

[54] BATTERY CONTAINER COVER
[75] Inventor: James H. Miller, Minneapolis, Minn.
[73] Assignee: Gould Inc., Mendota Heights, Minn.
[22] Filed: Feb. 1, 1972
[21] Appl. No.: 222,611

[52] U.S. Cl................ 136/170, 136/177, 220/29, 220/44 R
[51] Int. Cl... H01m 1/02, B65d 51/18, B65d 51/16
[58] Field of Search............ 220/29, 24.3, 44 R, 29; 136/170, 177; 206/2

[56] References Cited
UNITED STATES PATENTS

| | | | |
|---|---|---|---|
| 2,685,383 | 8/1954 | Kochner | 220/44 R |
| 3,067,905 | 12/1962 | Ehret | 206/2 |
| 3,161,548 | 12/1964 | Goldingay | 136/170 |
| 3,508,972 | 4/1970 | Goldingay | 136/170 |
| 3,360,403 | 12/1967 | Halsall | 136/170 |
| 2,758,147 | 8/1956 | Aller | 136/177 |
| 3,083,256 | 3/1963 | Slautterback | 136/177 |
| 3,276,913 | 10/1966 | Sabatino et al. | 136/170 |

Primary Examiner—William T. Dixson, Jr.
Assistant Examiner—Allan N. Shoap
Attorney, Agent, or Firm—Wolfe, Hubbard, Leydig, Voit & Osann, Ltd.

[57] ABSTRACT

A battery container cover that is essentially flat and formed with underlying grooves for receiving the top edges of the walls and partitions of a battery container, the cover having well portions sunk below its top surface which define conventional openings into the cells of the underlining container. Vented plugs close the openings, and a cover strip is sealed over the well portions to form a substantially continuous flat top. The cover strip is fitted onto a ledge, spaced by ribs from the sides of the ledge and fused to the main cover at spaced points so that gas escape passages are provided from the cell openings to the outside of the cover strip.

2 Claims, 4 Drawing Figures

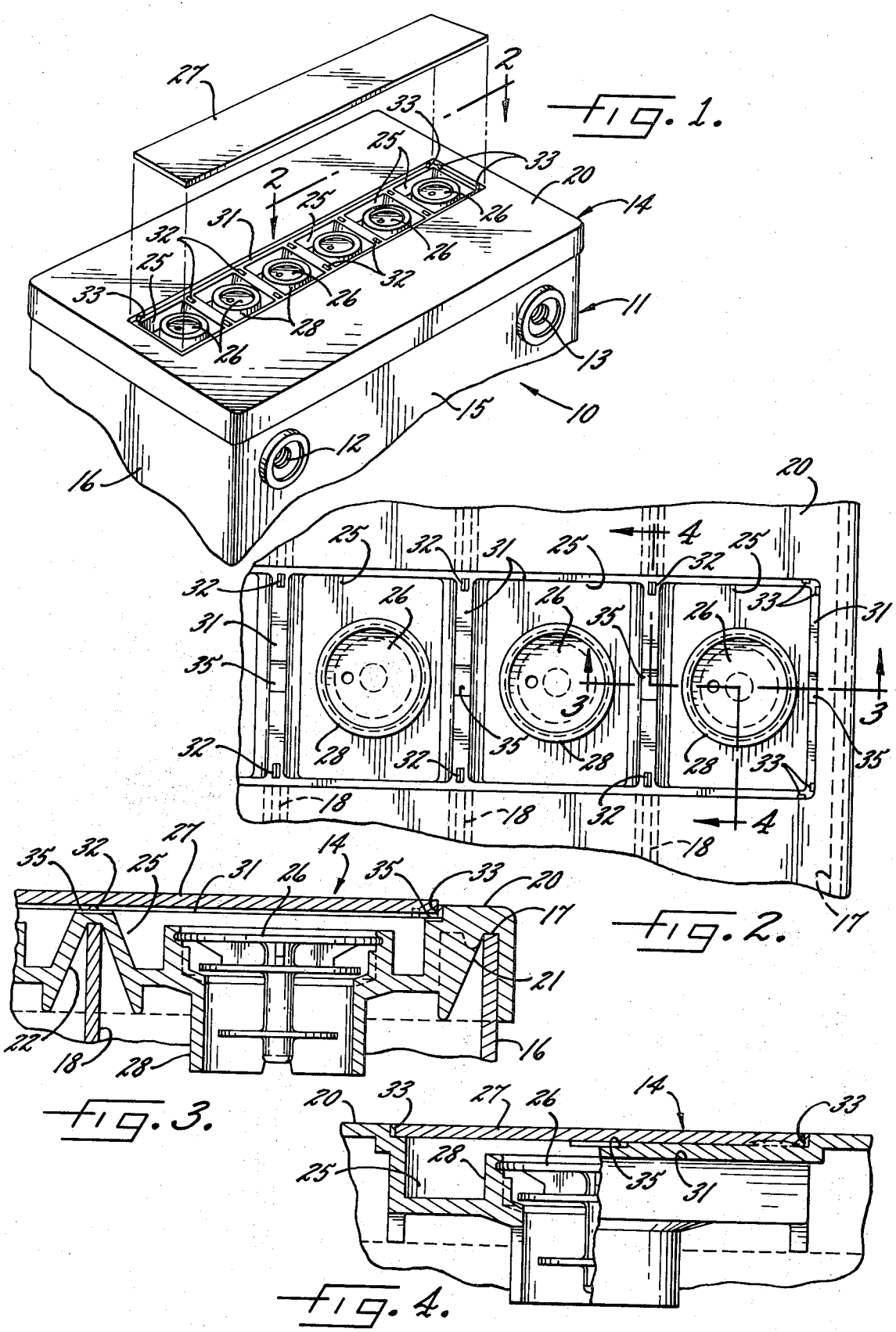

BATTERY CONTAINER COVER

This invention relates generally to automotive type electrical batteries and concerns, more particularly, a cover construction for such batteries.

There has been much recent interest in providing automotive type, wet cell, secondary electrical storage batteries in configurations which can be readily installed and which require, once in service, no further maintenance throughout the expected life of the battery. Two aspects of that effort are to avoid locating terminal connections on the top of the battery where they are subject to mechanical or corrosion damage, and to utilize internal components which make it unnecessary to inspect and replenish electrolyte levels in the cells over normal battery life. One external aspect of achieving such results is to make possible a completely flat and unbroken cover for such batteries which is attractive, which strongly suggests to purchasers and users the maintenance-free aspect of the battery, and which, in fact, reduces the likelihood of inadvertent damage to the battery.

Accordingly, it is the primary aim of the invention to provide a battery container cover that presents a flat outer appearance but which permits normal battery and battery cover manufacturing and assembly techniques to be used. As a result, batteries having such covers can be made on standard assembly lines by workers with standard training and skills with little increase in cost, and such production will be compatible with alternate production of more conventional batteries.

It is also an object of the invention to provide a cover of the above kind which unobtrusively provides gas vent openings.

An overall object is to provide the advantages of a flat, unbroken cover for automotive battery at minimum added manufacturing cost.

Other objects and advantages of the invention will become apparent upon reading the following description and upon reference to the drawings, in which:

FIG. 1 is a fragmentary perspective of a battery including a cover embodying the invention which is partially disassembled;

FIG. 2 is an enlarged fragmentary plan taken approximately along the line 2—2 in FIG. 1;

FIG. 3 is a fragmentary section taken approximately along the line 3—3 in FIG. 2 with the cover assembled but not sealed; and FIG. 4 is a fragmentary section taken approximately along the line 4—4 in FIG. 2 but with the cover parts in their final fused relationship.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is partially shown a battery 10 having a container 11 with side wall terminals 12 and 13 closed by a cover 14 embodying the invention and shown, for clarity, partially disassembled. The container 11 includes side and end walls 15 and 16, respectively, having a continuous upper peripheral edge 17 (see FIGS. 2 and 3), and a plurality of partitions 18 dividing the container 11 into cells, of which there are six in the illustrated construction. The upper edges of the partitions 18 lie in the same plane as the edge 17 of the side and end walls. The cover 14 includes a main body 20 formed to define a peripheral groove 21 for receiving the upper edge 17 of the side and end walls, and a plurality of transverse grooves 22 for receiving the upper edges of the partition walls 18. The edge contacting portions of the grooves 21, 22 all lie substantially in the same plane.

In accordance with the invention, the cover body 20 is formed with a row of well portions 25 sunk below the top plane of the cover between the grooves 21, 22, each well portion defining a cell opening closed by a vented plug 26, and a flat cover strip 27 is sealed over the row of well portions 25 so as to be substantially continguous with the top cover surface. Preferably, the well portions 25 are squarish depressions including annular collars 28 defining rather conventional circular cell access openings — one for each cell. The illustrated plugs are of the vented, baffled type similar to those shown in U.S. Pat. No. 3,108,911, issued Oct. 29, 1963 which prevent electrolyte from splashing from the openings while allowing the escape of gases from the cells.

Pursuant to the invention, the cover strip 27 is fitted onto a ledge 31 formed in the cover body 20 below the upper surface of the cover, around the well portions 25, and over the transverse grooves 22. Thus, when the cover strip is in place (see FIG. 4) the top of the cover 14 is substantially smooth.

For insuring proper mounting of the cover strip 27, a plurality of spaced lugs 32 are formed on the ledge 31 defining fusing points for securing the strip 27 onto the body 20, and a plurality of ribs 33, preferably two at each corner of the rectangular strip 27, center the strip from the sides of the ledge 31. The strip 27, being slightly smaller than the outer periphery of the ledge 31, fits easily onto the ledge and is centered by the ribs 33 into proper alinement. Then, the strip is pressed and sealed in place at the locations of the lugs 32, preferably by ultrasonic welding. In this way, it can be expected that gas escape paths will exist from the vented openings in the well portions 25 beneath and around the edges of the cover strip 27 between the locations of the lugs 32. However, to insure the provision of gas escape paths, the ledge 31 is formed with a plurality of slight depressions 35 defining passages opening each of the cells to the exterior of the cover 14. The depressions 35 simply lead, in the illustrated construction, to the opposite narrow edges of the cover strip 27 but the ribs 33 center the cover strip so that it is slightly spaced from the ledge edges to complete the gas escape paths.

Assembling of the battery 10 is done in the conventional fashion to the point illustrated in FIG. 1. That is, the plate and separator assemblies together with the terminals 12, 13 have been placed and connected within the container 11, the cover body 20 has been sealed to the container, electrolyte has been added to each of the cells, and the vented plugs 26 installed. The cover strip 27 is then placed over the well portions 25 within the positioning ribs 33 so that the cover strip rests on the lugs 32 (see FIG. 3). The cover strip 27 is then pressed onto the ledge and sealed at the locations of the lugs 32 so as to become fused to the cover body 20 (see FIG. 4).

Those familiar with this art will appreciate that the battery 10 is capable of being assembled using conventional techniques by workers having standard training and skills. Once in place, the cover strip 27, together with the cover body 20, defines a cover 14 having a substantially smooth upper surface which, quite unobtrusively, provides escape passages for gas generated within the battery cells. The advantages of a smooth, unbroken battery cover are thus obtained at little increase in manufacturing expense.

I claim as my invention:

1. A container cover for batteries comprising, in combination, a main body defining a top planar surface and a peripheral groove for receiving the upper peripheral edge of a box-like battery container, said body also defining a plurality of transverse grooves for receiving the upper edges of partition walls in said container, said peripheral groove and said transverse grooves having their edge contacting portions lying substantially in the same plane, said body having a row of well portions sunk below said plane between said grooves with each well portion defining an opening through the cover, a plurality of vented plugs fitted to close each of said openings, a flat cover strip lying over said well portions and sealed to said body so as to be substantially contiguous with said planar surface, said cover strip being fitted onto a ledge formed in said body below said planar surface, around said well portions and over said transverse grooves, a plurality of spaced lugs formed on said ledge defining fusing points for securing said strip on the ledge, and a plurality of ribs for centering the strip from the sides of the ledge.

2. The combination of claim 1 in which said strip and said ledge define thin passages opening each of said openings to the space between the strip and the sides of the ledge.

* * * * *